(12) United States Patent
Oda et al.

(10) Patent No.: US 9,276,451 B2
(45) Date of Patent: Mar. 1, 2016

(54) ELECTRICAL MOTOR

(71) Applicant: DAIKIN INDUSTRIES, LTD., Osaka-Shi (JP)

(72) Inventors: Kentarou Oda, Tokyo (JP); Nobuyoshi Sakuma, Tokyo (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 197 days.

(21) Appl. No.: 14/104,005

(22) Filed: Dec. 12, 2013

(65) Prior Publication Data

US 2014/0097714 A1 Apr. 10, 2014

Related U.S. Application Data

(63) Continuation of application No. PCT/JP2012/067338, filed on Jul. 6, 2012.

(30) Foreign Application Priority Data

Jul. 13, 2011 (JP) ................................ 2011-154720

(51) Int. Cl.
*H02K 9/00* (2006.01)
*H02K 9/20* (2006.01)
(Continued)

(52) U.S. Cl.
CPC ................ *H02K 9/20* (2013.01); *H02K 5/1672* (2013.01); *H02K 5/1732* (2013.01); *H02K 5/20* (2013.01); *H02K 9/24* (2013.01); *H02K 11/0089* (2013.01); *H02K 9/19* (2013.01)

(58) Field of Classification Search
CPC ....... H02K 5/20; H02K 9/19; H02K 11/0089; H02K 9/24; H02K 9/20
USPC .................................................. 310/58, 60 A
See application file for complete search history.

(56) References Cited

U.S. PATENT DOCUMENTS 5,402,023 A 3/1995 Nakanishi et al.
8,664,812 B2 * 3/2014 Vicars et al. ................ 310/68 R
(Continued)

FOREIGN PATENT DOCUMENTS

CN 1547309 A 11/2004
CN 1750363 A 3/2006
(Continued)

OTHER PUBLICATIONS

International Search Report mailed on Jul. 31, 2012 for PCT/JP2012/067338 filed on Jul. 20, 2012 with English Translation.
(Continued)

*Primary Examiner* — Hanh Nguyen
(74) *Attorney, Agent, or Firm* — Oblon, McClelland, Maier & Neustadt, L.L.P.

(57) ABSTRACT

An electrical motor includes a motor case inside which an inner space is formed, a bearing disposed so as to pass through a wall of the motor case, a rotor shaft rotatably supported by the bearing, and an earth conductor fixed with the motor case and provided with a frame and an electrical conductor provided on the frame. The frame has an annular inner circumferential surface along an outer circumference of the rotor shaft and is fixed with the motor shaft. The electrical conductor is disposed on the inner circumferential surface of the frame so as to slidably contact its end with the rotor shaft. A bypass flow passage is provided between the earth conductor and the motor case. The inner space is communicated with an outside of the motor case via the bypass flow passage. According to the motor, its inside can be cooled without damaging the earth conductor.

5 Claims, 5 Drawing Sheets

(51) Int. Cl.
*H02K 5/167* (2006.01)
*H02K 5/173* (2006.01)
*H02K 11/00* (2006.01)
*H02K 9/24* (2006.01)
*H02K 5/20* (2006.01)
*H02K 9/19* (2006.01)

(56) References Cited

U.S. PATENT DOCUMENTS

| | | | |
|---|---|---|---|
| 2004/0184215 A1 | 9/2004 | Oh et al. | |
| 2004/0233592 A1 | 11/2004 | Oh et al. | |
| 2005/0207888 A1 | 9/2005 | Kashiwazaki et al. | |
| 2006/0007609 A1 | 1/2006 | Oh et al. | |
| 2007/0040459 A1* | 2/2007 | Oh | 310/68 C |
| 2007/0108864 A1 | 5/2007 | Suzuki | |
| 2008/0258576 A1 | 10/2008 | Oh et al. | |
| 2010/0001602 A1* | 1/2010 | Bossaller et al. | 310/89 |
| 2010/0127585 A1* | 5/2010 | Fee et al. | 310/71 |
| 2011/0204734 A1* | 8/2011 | Orlowski et al. | 310/85 |
| 2011/0216466 A1 | 9/2011 | Oh et al. | |
| 2012/0212875 A1 | 8/2012 | Oh et al. | |

FOREIGN PATENT DOCUMENTS

| | | |
|---|---|---|
| CN | 101151780 A | 3/2008 |
| CN | 101682234 A | 3/2010 |
| EP | 0 480 484 A2 | 4/1992 |
| JP | S56-12456 | 2/1981 |
| JP | S56-94156 | 7/1981 |
| JP | 2008-537469 A | 9/2008 |
| JP | 4485897 B2 | 6/2010 |
| JP | 2010-525787 A | 7/2010 |

OTHER PUBLICATIONS

Combined Office Action and Search Report issued Jun. 30, 2015 in Chinese Patent Application No. 201280034178.7 (with English language translation).

\* cited by examiner

ELECTRICAL MOTOR

CROSS-REFERENCE TO RELATED APPLICATIONS

The present application is a Continuation Application of PCT International Application No. PCT/JP2012/067338 (filed on Jul. 6, 2012), which is based upon and claims the benefit of priority from Japanese Patent Application No. 2011-154720 (filed on Jul. 13, 2011), the entire contents of which are incorporated herein with reference.

BACKGROUND OF THE INVENTION

1. Technical Field

The present invention relates to an electrical motor that is driven while its rotational speed is variably controlled.

2. Background Art

Conventionally, rotational speed of an electrical motor is controlled by using an inverter. However, shaft current flows through a rotor shaft of the electrical motor due to a pulse wave of output voltage from the inverter, and thereby discharges occur in a bearing(s) when the shaft current flows to a motor case through the bearing. There is a disadvantage that the bearing may be made electrically corroded by these discharges. In order to prevent such electrical corrosions, it is done to flow electrical charge remained in the rotor shaft to the motor case without flowing it through the bearing by using an earth conductor. Patent Documents 1 (Japanese Granted Patent Publication No. 4485897) and Patent Document 2 (PCT International Application Japanese Translation Publication No. 2010-525787) disclose such an earth conductor. In such an earth conductor, its annular frame is fixed to a motor case, and a rotor shaft is inserted through the annular frame. In addition, many fiber-like conductors are mounted on an inner surface of the annular frame toward the rotor shaft, and distal ends of the fiber-like conductors are contacted with the rotor shaft. According to this configuration, the electrical charge remained in the rotor shaft flows to the motor case through the fiber-like conductors.

SUMMARY OF INVENTION

Since an electrical motor is highly-heated due to a long time drive or a large load, it may be provided with a cooling mechanism for cooling its inside. Known is a cooling device that sprays refrigerant liquid to an inside of a motor for cooling by vaporization heat. In a case of using such a cooling device, inside pressure of the motor rises higher than outside pressure due to vaporization of the refrigerant liquid, and thereby the vaporized refrigerant may leak out from a gap between a motor case and a rotor shaft or a gap between the rotor shaft and a bearing(s). The above-explained fiber-like conductors as an earth conductor are fluttered by a flow of the refrigerant gas that leaks out, so that their degradations are accelerated and then they are lost. The lost fiber-like conductors cannot only fulfill its original function, but also may cause problems such as stuck into the bearing and commixture into lubrication oil as impurities.

An object of the present invention is to provide an electrical motor that can cool its inside without damaging its earth conductor.

An aspect of the present invention provides an electrical motor comprising: a motor case inside which an inner space is formed; a bearing disposed so as to pass through a wall of the motor case; a rotor shaft rotatably supported by the bearing; and an earth conductor that is fixed with the motor case and includes a frame and an electrical conductor provided on the frame, wherein the frame has an annular or curved inner circumferential surface along an outer circumference of the rotor shaft and is fixed with the motor case, the electrical conductor is disposed on the inner circumferential surface of the frame so that an end of the electrical conductor is slidably contacted with the rotor shaft, a bypass flow passage is provided between the earth conductor and the motor case, and the inner space and an outside of the motor case are communicated with each other via the bypass flow passage.

According to the above electrical motor, pressure of fluid used for cooling its inside rises higher than outside pressure due to heat, and thereby flows out from the motor case through the bypass flow passage, instead of through a gap between the earth conductor and the rotor shaft that provides larger flow resistance. Therefore, when cooling the inside of the electrical motor (motor case), it is possible to control the electrical motor using an inverter (variable frequency control) without damaging the electrical conductor.

Here, if the inner space is filled with higher-pressure gas than pressure outside the motor case, the above-mentioned fluid is changed from refrigerant liquid to refrigerant gas in the electrical motor (motor case) and thereby the refrigerant gas prominently flows out from the inside of the electrical motor (motor case) to the outside thereof. However, as mentioned above, since the refrigerant gas flows out from the motor case through the bypass flow passage, instead of through the gap between the earth conductor and the rotor shaft that provides larger flow resistance, the advantage of controlling the electrical motor using an inverter without damaging the electrical conductor can be brought prominently.

In addition, it is preferable that a flow passage cross-sectional area of the bypass flow passage is made larger than a cross-sectional area of a gap between the frame and the rotor shaft.

In addition, it is preferable that the motor case has a cylindrical sealing member, a labyrinth seal is formed on an inner surface of the sealing member, cylindrical one end of the sealing member is fixed with the motor case, the rotor shaft is inserted into the sealing member, and the earth conductor is fixed with the motor case by being attached to cylindrical another end of the sealing member.

In addition, it is preferable that the bypass flow passage is formed as a groove on at least one of the frame of the earth conductor and the motor case at a joint surface of the frame and the motor case.

DESCRIPTION OF EMBODIMENT

Figure 1:
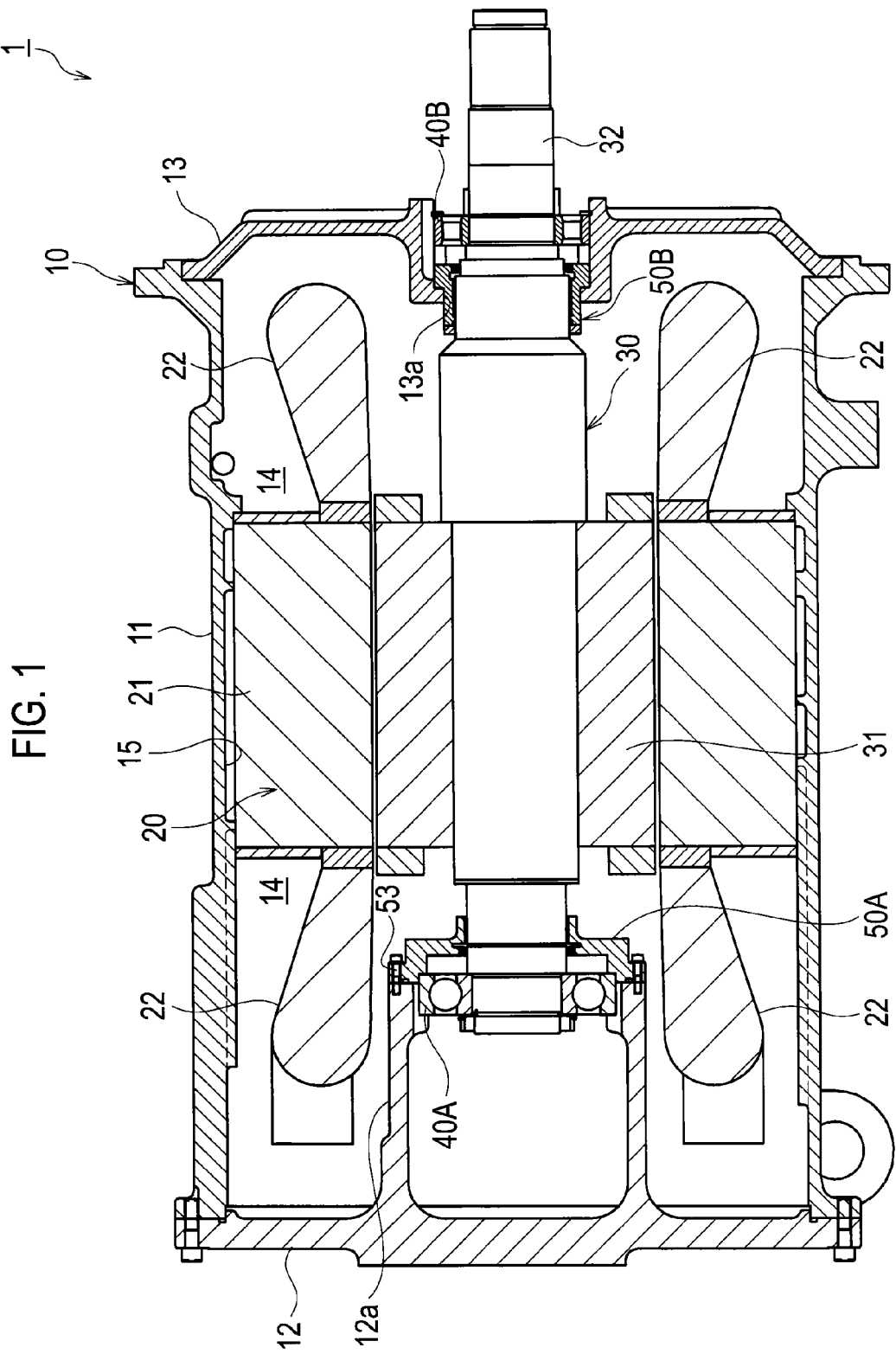
FIG. 1 is a cross-sectional view of an electrical motor according to an embodiment.

An electrical motor 1 according to an embodiment will be explained with reference to the drawings. The electrical motor 1 is an alternate current motor, and includes a motor case 10, a stator 20 and a rotor 30 as shown in FIG. 1.

The motor case 10 is configured of a circumferential wall 11, and an end wall 12 and a pass-through wall 13 that close both ends of the circumferential wall 11. An inner space 14 is formed inside the motor case 10 (the circumferential wall 11, the end wall 12 and the pass-through wall 13). The stator 20 is disposed on an inner circumferential surface of the circumferential wall 11. The stator 20 is configured by winding coils around a cylindrical stator iron core 21.

A support cylinder 12a is protruded from the center of the end wall 12 toward the inner space 14. A ball bearing 40A and a sealing end member 50A are attached to an end of the support cylinder 12a. On the other hand, a cylindrical hole 13a is formed at the center of the pass-through wall 13. A roller bearing 40B and a cylindrical sealing member 50B are attached to the cylindrical hole 13a. In addition, after-explained refrigerant gas can flow through the roller bearing 40B. Note that the sealing members 50A and 50B are formed of electrically conductive material (metal). Therefore, in view of electricity, the sealing members 50A and 50B can be regarded as portions of the motor case 10.

Each of the sealing members 50A and 50B has an almost cylindrical shape, and is provided with a labyrinth seal 52 (see FIG. 2 and FIG. 3) configured by plural annular protrusions 51 each of which is formed on an inner surface thereof and has an almost triangle cross-sectional shape. A wall-side end 53 of the sealing end member 50A is fixed with the support cylinder 12a with no gap. Similarly, a wall-side end (cylindrical one end) 54 of the cylindrical sealing member 50B is fixed with the cylindrical hole 13a with no gap.

Figure 2:
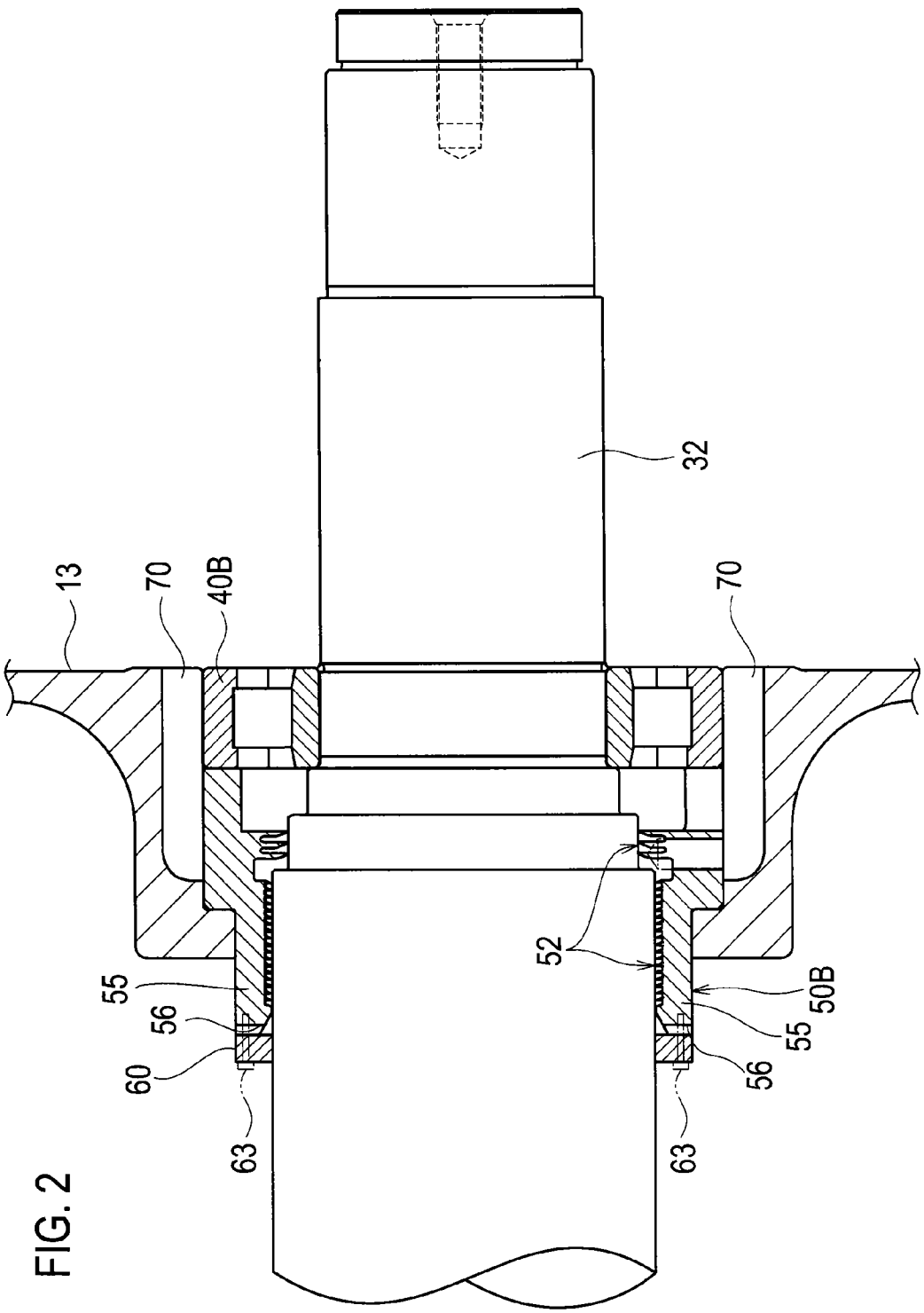
FIG. 2 is an enlarged cross-sectional view showing a featured portion of the electrical motor.

In addition, as shown in FIG. 2, an earth conductor 60 is fixed, by screws 63, with an end (cylindrical another end) 55 of the cylindrical sealing member 50B on a side of the inner space 14. Note that exact positions of the screws 63 are indicated by screw holes 64a in FIG. 4 and screw holes 64b in FIG. 5. The earth conductor 60 includes an annular conductive frame 61 as shown in FIG. 5, and many fiber-like conductors (electrical conductors: conductive brush) 62 extended inward from an inner circumferential surface 61a of the annular conductive frame 61. When a rotor shaft 32 is inserted into the earth conductor 60 and the cylindrical sealing member 50B, ends of the fiber-like conductors 62 are contacted with an outer circumferential surface of the rotor shaft 32.

The rotor 30 is configured of a cylindrical rotor coil 31 and the rotor shaft 32. The rotor coil 31 is configured by winding coils around a cylindrical iron core. The rotor shaft 32 is inserted-into and fixed-with the rotor coil 31. In addition, the rotor 30 is rotatably supported by the end wall 12 and the pass-through wall 13 with the bearings 40A and 40B interposed therebetween and with the rotor coil 31 located inside the stator 20.

Figure 3:
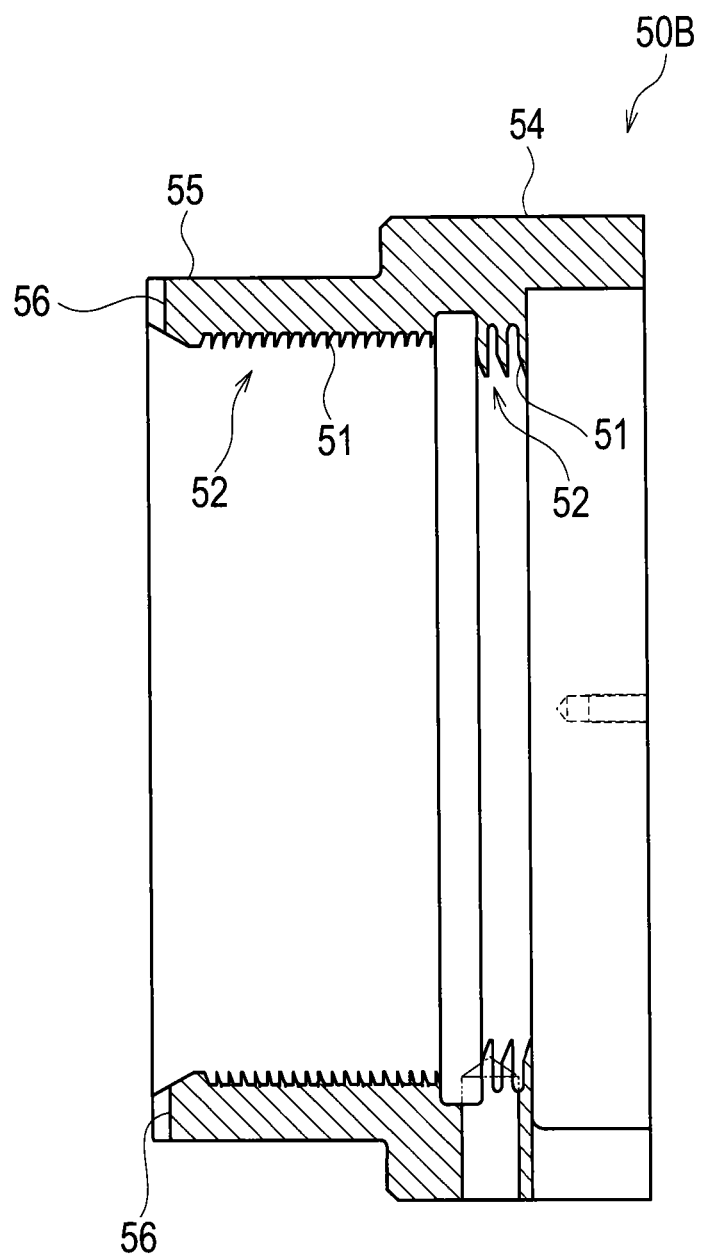
FIG. 3 is a cross-sectional view of a sealing member of the electrical motor.
Figure 4:
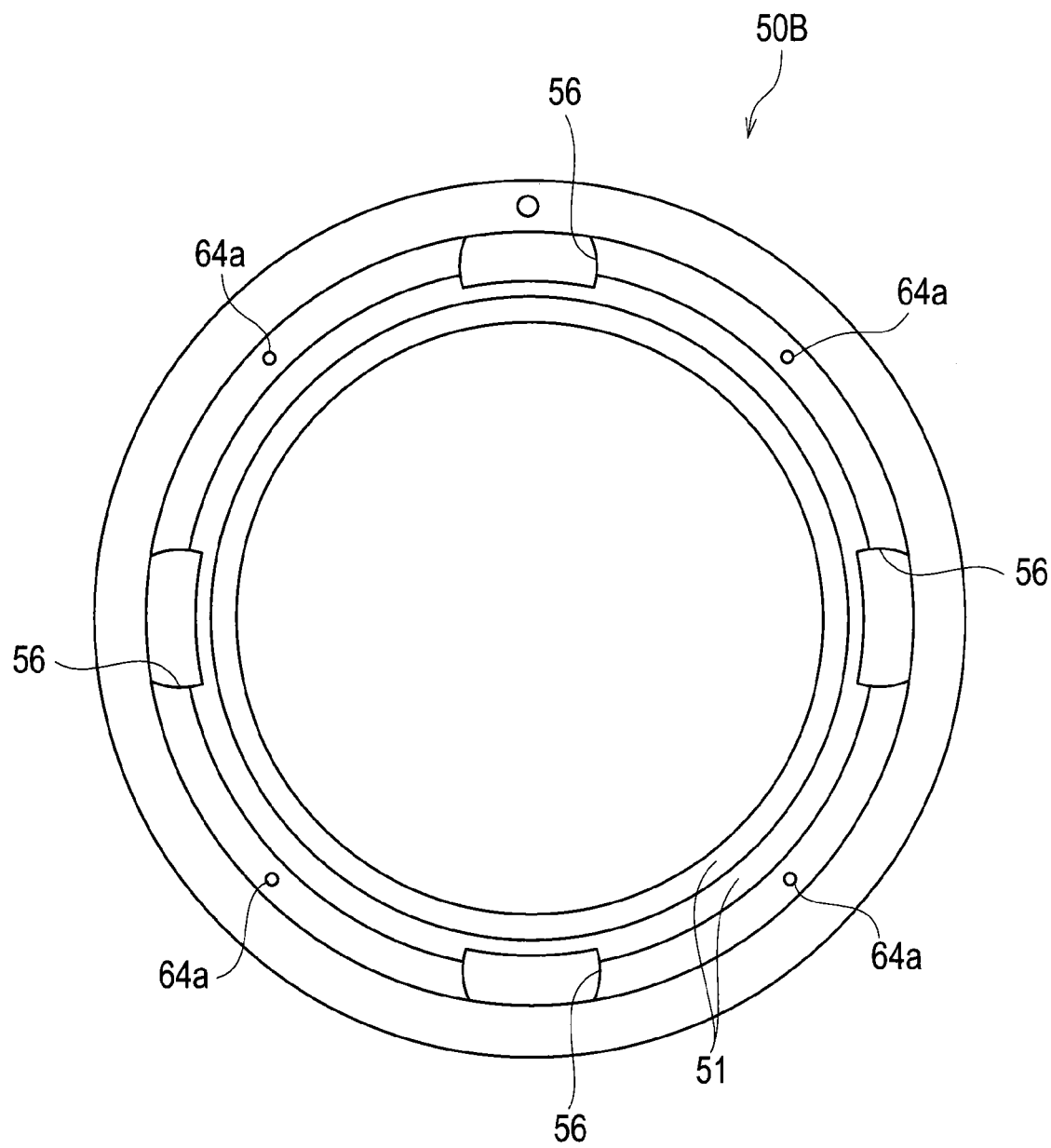
FIG. 4 is a front view of the sealing member.
Figure 5:
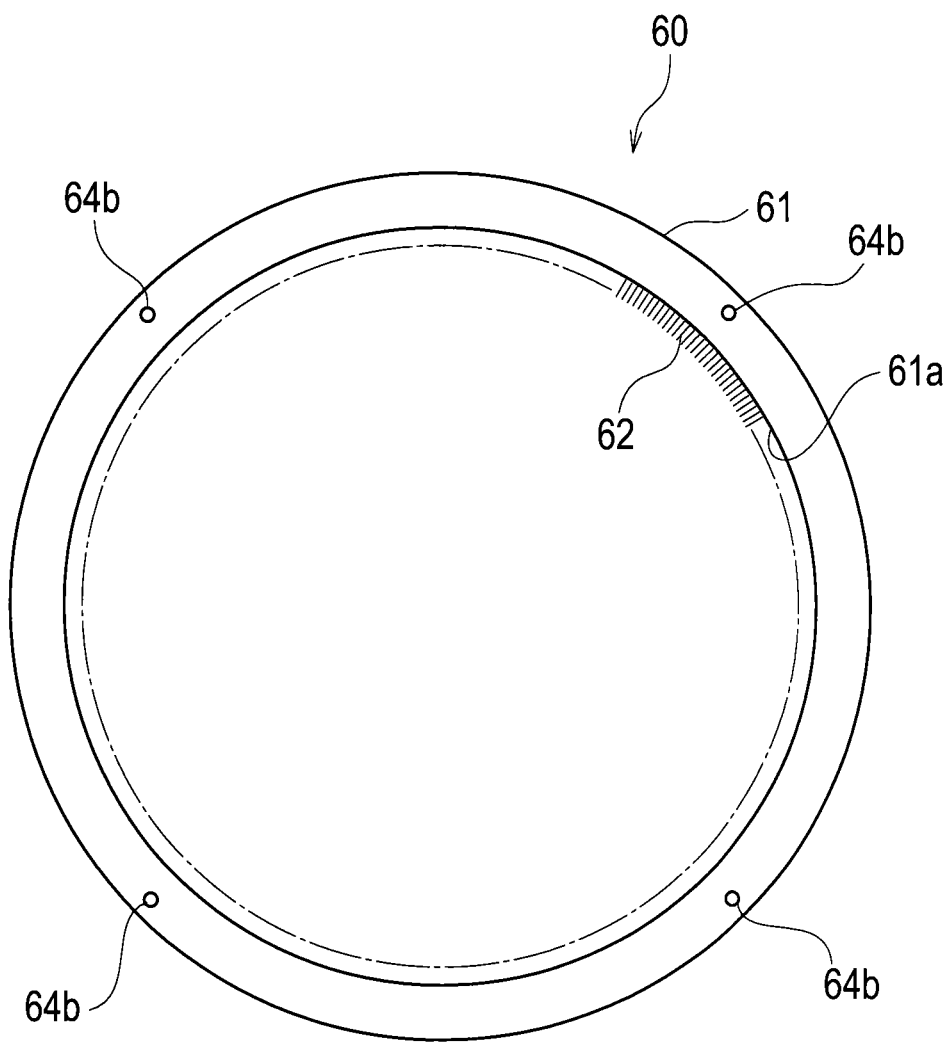
FIG. 5 is front view of an earth conductor of the electrical motor.

As shown in FIG. 3 and FIG. 4, bypass flow passages 56 are formed, as grooves, on a joint surface of the end 55 of the cylindrical sealing member 50B with the earth conductor 60. Note that the bypass flow passages may be formed, as grooves, on the earth conductor 60. Alternatively, they may be formed on both of the cylindrical sealing member 50B and the earth conductor 60. By forming the bypass flow passages on the joint surface as grooves, the bypass flow passages can be formed by easy workings.

Here, a total cross-sectional area (total flow passage cross-sectional area) of the bypass flow passages 56, viewed from an axial direction of the rotor shaft 32, is made larger than a cross-sectional area of a gap where the fiber-like conductors 62 are disposed (gap between the annular conductive frame 61 and the rotor shaft 32). Namely, flow resistance through the bypass flow passages 56 is smaller than flow resistance through the gap where the fiber-like conductors 62 are disposed (gap between the annular conductive frame 61 and the rotor shaft 32).

In addition, the electrical motor 1 is provided with cooling flow paths 15 as a cooling mechanism. The cooling flow paths 15 is paths through which refrigerant supplied from the outside of the electrical motor 1 circulates in the motor case 10. The cooling flow paths 15 are formed between the circumferential wall 11 and the stator iron core 21. The refrigerant liquid supplied from the outside cools the stator iron core 21 while flowing through the cooling flow paths 15, and some of the refrigerant liquid becomes refrigerant gas. The refrigerant that has cooled the stator iron core 21 is discharged, in a gas-liquid mixed state, to a side of the end wall 12 in the inner space 14 to cool a coil end 22. Almost all of the refrigerant that has cooled the coil end 22 becomes refrigerant gas.

Due to change from the refrigerant liquid to the refrigerant gas, pressure in the side of the end wall 12 in the inner space 14 rises, and the refrigerant gas moves to a lower-pressure side of the pass-through wall 13 in the inner space 14 through a gap between the stator iron core 21 and the rotor coil 31. The refrigerant gas that has moved into the side of pass-through wall 13 in the inner space 14 is discharged to a refrigerant circulation passage outside the motor case 10 through a discharge port (not shown) provided on the motor case 10. In addition, the refrigerant gas that has moved into the side of pass-through wall 13 in the inner space 14 flows out to a lower-pressure outside of the motor case 10 through the bypass flow passages 56 and a flow passage 70 (see FIG. 2) outside the roller bearing 40B. Note that the refrigerant gas flow through not only the flow passage 70 outside the roller bearing 40B but also through the roller bearing 40B itself.

As explained above, the inner pressure in the motor case 10 rises higher than the outside pressure due to the change from refrigerant liquid to refrigerant gas, and thereby the refrigerant gas flows out from the motor case 10 through the flow passage 70 outside the roller bearing 40B. In this regard, the refrigerant gas doesn't flow through the fiber-like conductors 62 but through the bypass flow passages 56 before it reaches the flow passage 70 outside the roller bearing 40B. Therefore, the refrigerant gas hardly flows through the fiber-like conductors 62, so that it doesn't damage the fiber-like conductors 62 and electrical charge remained in the rotor shaft 32 (shaft current) can be eliminated stably via the fiber-like conductors 62.

In addition, since the flow passage cross-sectional area of the bypass flow passages 56 is made larger than the cross-sectional area of the gap where the fiber-like conductors 62 are disposed (gap between the annular conductive frame 61 and the rotor shaft 32), the refrigerant gas flows out from the motor case 10 through the bypass flow passages 56 that provide smaller flow resistance. Therefore, damages of the fiber-like conductors 62 can be further avoided and the electrical charge remained in the rotor shaft 32 (shaft current) can be eliminated more stably via the fiber-like conductors 62.

Further, a small amount of the refrigerant gas may flows through the fiber-like conductors 62 but an refrigerant amount flowing out from the electrical motor 1 is reduced by disposing the earth conductor 60 at the end 55 of the cylindrical sealing member 50B on a side of the inner space 14, so that damages of the fiber-like conductors 62 can be further avoided and the electrical charge remained in the rotor shaft 32 (the shaft current) can be eliminated more stably via the fiber-like conductors 62.

In addition, the bypass flow passages 56 can be formed on the cylindrical sealing member 50B by relatively easy workings such as cutting work using an end mill or the like, and the bypass flow passages 56 never affects electrical charge elimination performance of the earth conductor 60.

Note that, in the above embodiments, the earth conductor 60 includes the annular conductive frame 61 and is formed in an annular shape. However, the earth conductor is not limited to an annular shape. For example, the earth conductor may be formed in a curved shape such as a half-annular shape along part of an outer circumferential surface of the rotor shaft 32, and can take various shapes.

In addition, in the above embodiment, the fiber-like conductors (electrical conductors) 62 are mounted thickly on the inner circumferential surface 61*a* of the annular conductive frame 61 of the earth conductor 60. However, the electrical conductor(s) is not limited to a fiber-like member. For example, the electrical conductor(s) may be configured by a sheet-like member that is disposed on the inner circumferential surface 61*a* along the axial direction of the rotor shaft 32 so as to contact a surface of the sheet member with a surface of the rotor shaft 32, and can take various shapes.

In addition, in the above embodiment, the refrigerant gas that has flown through the bypass flow passages 56 flows out from the motor case 10 through the flow passage 70 outside the roller bearing 40B (and through the roller bearing 40B itself). However, another flow passage(s) may be provided for the refrigerant gas other than the above-explained flow passage 70.

What is claimed is:

1. An electrical motor comprising:
   a motor case inside which an inner space is formed;
   a bearing disposed so as to pass through a wall of the motor case;
   a rotor shaft rotatably supported by the bearing; and
   an earth conductor that is fixed with the motor case and includes a frame and an electrical conductor provided on the frame, wherein
   the frame has an annular or curved inner circumferential surface along an outer circumference of the rotor shaft and is fixed with the motor case,
   the electrical conductor is disposed on the inner circumferential surface of the frame so that an end of the electrical conductor is slidably contacted with the rotor shaft,
   a bypass flow passage is provided between the earth conductor and the motor case, and
   the inner space and an outside of the motor case are communicated with each other via the bypass flow passage.

2. The electrical motor according to claim 1, wherein
   the inner space is filled with higher-pressure gas than pressure outside the motor case.

3. The electrical motor according to claim 1, wherein
   a flow passage cross-sectional area of the bypass flow passage is made larger than a cross-sectional area of a gap between the frame and the rotor shaft.

4. The electrical motor according to claim 1, wherein
   the motor case has a cylindrical sealing member,
   a labyrinth seal is formed on an inner surface of the sealing member,
   cylindrical one end of the sealing member is fixed with the motor case,
   the rotor shaft is inserted into the sealing member, and
   the earth conductor is fixed with the motor case by being attached to cylindrical another end of the sealing member.

5. The electrical motor according to claim 1, wherein
   the bypass flow passage is formed as a groove on at least one of the frame of the earth conductor and the motor case at a joint surface of the frame and the motor case.

* * * * *